United States Patent [19]

Ikebata et al.

[11] 4,125,795
[45] Nov. 14, 1978

[54] CONVERGENCE APPARATUS

[75] Inventors: Shigeki Ikebata; Junichi Fujino; Hideto Miyazaki, all of Amagasaki, Japan

[73] Assignee: Mitsubishi Denki Kabushiki Kaisha, Tokyo, Japan

[21] Appl. No.: 799,994

[22] Filed: May 24, 1977

[30] Foreign Application Priority Data

Jun. 1, 1976 [JP] Japan .................. 51-64875

[51] Int. Cl.² ................ H01J 29/70; H01J 29/76
[52] U.S. Cl. ................... 315/368; 315/13 C
[58] Field of Search .............. 315/368, 13 C

[56] References Cited

U.S. PATENT DOCUMENTS 3,622,835  11/1971  Parker .................. 315/13 C

Primary Examiner—Maynard R. Wilbur
Assistant Examiner—T. M. Blum
Attorney, Agent, or Firm—Oblon, Fisher, Spivak, McClelland & Maier

[57] ABSTRACT

A convergence apparatus in a convergence circuit of a CRT, comprises, means for dividing a horizontal parabolic waveform voltage in suitable voltage levels corresponding to a vertical parabolic waveform voltage; means for shaping the waveforms of the divided voltage signals; means for composing the shaped voltage signals to give the shaped covergence correction voltage signal; and means for feeding the current corresponding to the shaped convergence correction voltage signal waveform to a convergence coil to correct the scanning positions of the electron beams.

4 Claims, 4 Drawing Figures

CONVERGENCE APPARATUS

BACKGROUND OF THE INVENTION

The present invention relates to a deflecting apparatus for shadow mask color CRT ect. More particularly, it relates to a convergence apparatus for the CRT scanning the display surface by a plurality of electron beams.

Heretofore, in the convergence circuitry of the conventional shadow mask color CRT, the desired correction magnetic field has been produced by feeding a current which is proportional to a parabolic waveform voltage given by integrating the horizontal deflecting current or the vertical deflecting current, to a horizontal or vertical convergence coil.

However, in the conventional apparatus, a uniform correction could not be attained on all of the picture surface of the CRT. Especially, at the four corners of the picture surface, the divergence is large. The convergence corrections needed at zones on the CRT picture surface are affected by the fluctuations of the CRT itself and the deflecting coil etc.. Accordingly, it has been difficult to attain convergence of the beam having high accuracy on all of the picture surface of the CRT.

SUMMARY OF THE INVENTION

It is an object of the present invention to overcome the disadvantages of the conventional apparatus and to attain the convergence corrections suitable for the CRT characteristics.

The foregoing and other objects of the present invention are attained by providing a convergence apparatus wherein a horizontal parabolic waveform voltage given by integrating a horizontal deflecting current is sliced in suitable voltage level into two voltage waveforms (the central voltage waveform and the peripheral voltage waveform) corresponding to the central part and the peripheral part of the picture surface; and the voltage waveforms are independently controlled and the controlled waveforms are composed to independently correct the convergences in the central part and the both edge parts; the voltage level for slicing the horizontal parabolic waveform voltage is varied depending upon the vertical barabolic waveform voltage given by integrating the vertical deflecting current to continuously vary the slice levels in the vertical direction and to give the shaped horizontal parabolic waveform voltage which has high ratio of the central voltage waveform in the central part and has the ratio of the peripheral voltage waveform which gradually increases to the upper and lower edge parts; and the current being proportional to the shaped horizontal barabolic waveform voltage is fed to a horizontal convergence coil, to attain the convergence correction suitable for the CRT characteristics.

DESCRIPTION OF THE PREFERRED EMBODIMENTS

Figure 1:
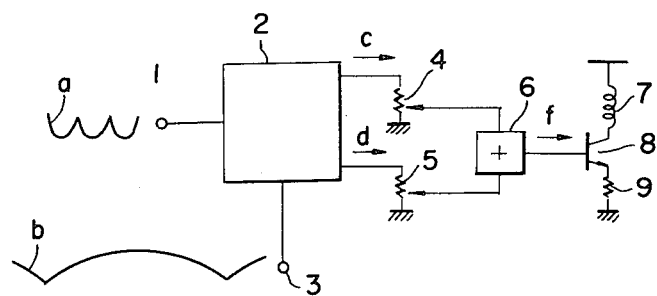
FIG. 1 is a block diagram of the convergence apparatus of the present invention.
Figure 2:
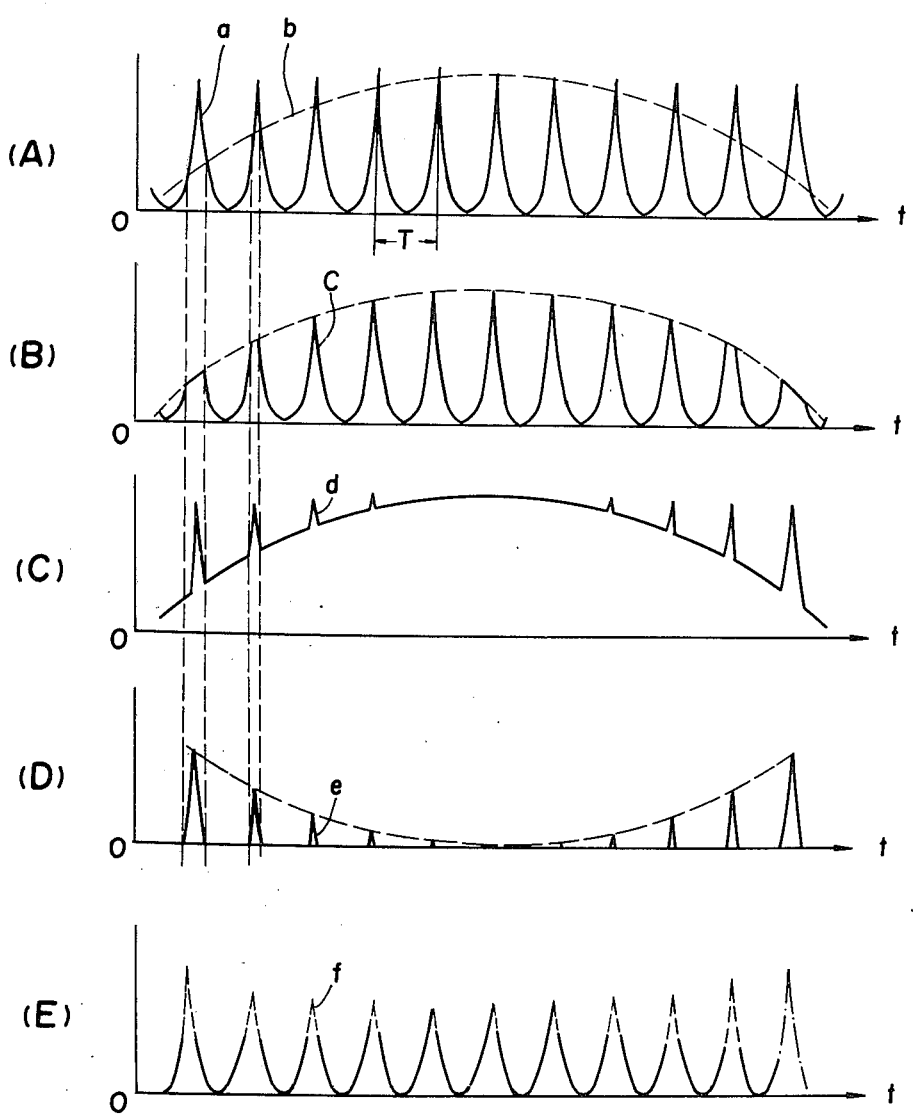
FIG. 2 shows waveforms for illustrating the operation of the convergence apparatus of FIG. 1.

FIG. 1 is a block diagram of one embodiment of the convergence apparatus of the present invention and FIG. 2 (A) to (E) shows waveforms for illustrating the operation of the convergence apparatus.

In FIG. 1, the reference numeral 1 designates an input terminal for a horizontal parabolic waveform voltage signal $a$ which is given by integrating the horizontal deflecting current; 2 designates a slicer circuit for slicing the horizontal parabolic waveform voltage a; 3 designates an input terminal for vertical parabolic waveform voltage $b$ which is given by integrating the vertical deflecting current and which decides the slicing level of the slicer circuit 2; 4 and 5 respectively designate varistors for independently varying amplitudes of the lower and upper parabolic waveform voltages $c$, $d$ divided by slicing the parabolic waveform voltage by the slicer circuit 2; 6 designates a composite circuit for recomposing the lower and upper parabolic waveform $c$, $d$; 7 designates a convergence coil; 8 designates a transistor for feeding the current corresponding to the recombined horizontal parabolic waveform voltage $f$ and 9 designates a resistor.

In FIG. 1, the horizontal parabolic waveform voltage a is devided into the lower and upper parabolic waveform voltages $c$, $d$ in the vertical parabolic waveform level $b$ by the slicer circuit 2.

As described above, the horizontal parabolic voltage $a$ is generated by the horizontal deflecting current and the divided lower and upper parabolic waveform voltages $c$, $d$ respectively correspond to the horizontal central part and the horizontal edge parts on the CRT picture surface.

Figure 3:
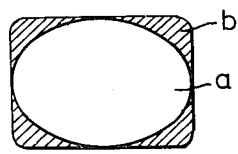
FIG. 3 shows zones on the CRT picture surface which is corrected by the convergence correction by divided parabolic voltages.

Under the consideration of the variation of the slicing level corresponding to the vertical parabolic waveform voltage $b$ as shown in FIG. 2, the boundaries between the horizontal central part and the horizontal edge parts on the CRT picture surface are shifted depending upon the vertical scanning of the picture surface. That is, the CRT picture surface is divided into the central part, and the peripheral parts as shown in FIG. 3, and the lower parabolic waveform voltage $c$ corresponds to the central part and the upper parabolic waveform voltage $d$ corresponds to the peripheral parts as the convergence corrections.

The varistors 4, 5 are used for separately controlling the amplitudes of the lower and upper parabolic waveform voltage $c$, $d$, whereby the lower and upper parabolic waveform voltages $c$, $d$ whose amplitudes are controlled as desired, are recombined by the composite circuit 6 to give the shaped parabolic waveform voltage $f$ and the output transistor 8 is controlled by the voltage $f$.

Accordingly, the current corresponding to the shaped waveform of the parabolic waveform voltage $f$ is fed to the convergence coil 7 to generate the correction magnetic fields for correcting the position of the electron beams whereby the correction magnetic fields in the central part and the peripheral parts on the picture surface can be independently controlled.

In FIG. 2, the waveform $e$ is formed by clamping the bottom of the waveform $d$ at zero level, and is needed for forming the shaped waveform $f$ from the waveforms $c$, $d$ as described below.

Figure 4:
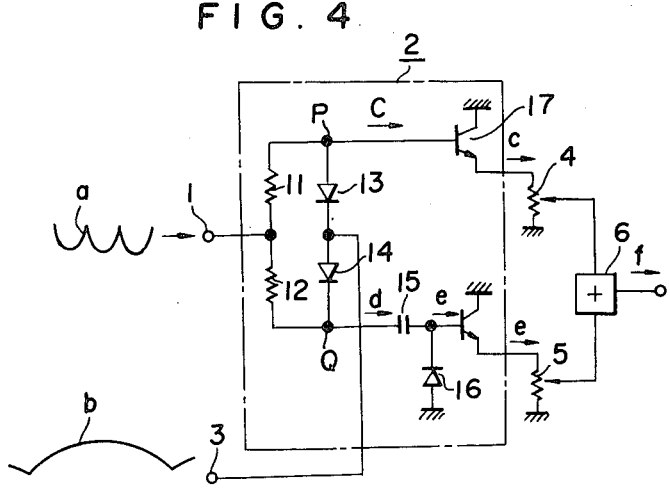
FIG. 4 is a circuit diagram of one embodiment of a slicer circuit used in the apparatus of the present invention.

FIG. 4 shows one embodiment of the slicer circuit 2 wherein the reference numerals 11; 12 designate resistors; 13, 14, 16 designate diodes; 15 designates a capacitor; and 17, 18 designate transistors.

The operation of the circuit will be illustrated.

When the input horizontal parabolic waveform voltage $a$ is lower than the input vertical parabolic waveform voltage $b$, the diode 13 is in OFF state and the diode 14 is in ON state. Accordingly, the part of the input horizontal parabolic waveform voltage $a$ being lower than the vertical parabolic waveform voltage $b$ is applied to the contact P without substantial change. However, the potential at the contact Q is fixed to the vertical parabolic waveform voltage $b$. On the other hand, when the horizontal parabolic waveform voltage $a$ is higher than the vertical $e$, the diode 13 is in On state and the diode 14 is in OFF state.

Accordingly, the potential at the contact P is fixed to the vertical parabolic waveform voltage $b$ and a part of the input horizontal parabolic waveform voltage $a$ being higher than the vertical $b$ is applied to the contact Q. Accordingly, the waveforms at the contacts P and Q are respectively the voltages $c$ and $d$ to the input parabolic waveform voltage $a$ shown in FIG. 2(A). The waveform at the contact P is directly applied to the transistor 17. The bottom of the waveform at the contact Q is fixed to zero potential by the clamping circuit comprising the capacitor 15 and the diode 16 to form the waveform $e$ shown in FIG. 2(D). The waveform voltage $e$ is applied to the transistor 18. In the transistors 17, 18, the base voltages are respectively given to the emitters thereof. Accordingly, the voltages $c$, $e$ are respectively applied to the varistors 4, 5 and the amplitudes of the voltages are respectively controlled and the voltages are applied to the composite circuit 6. The parabolic waveform voltage $f$ whose upper and lower parts are shaped as shown in FIG. 2(E) is given as the output of the composite circuit 6.

When the feeder 8 for feeding the current to the convergence coil 7 is controlled by the parabolic waveform voltage $f$, the convergence having high accuracy can be given on all of the CRT picture surface in comparison with the conventional uniform correction.

In the above embodiment, the correction of the convergences was made by dividing the CRT picture surface into the central part and the peripheral parts. The present invention is not limited to the above embodiment and the correction of the convergences can be attained by dividing the CRT picture surface into three or more parts depending upon the size of the CRT picture surface or the required accuracy of the convergences.

As the slicing voltages in the case, more than two vertical parabolic waveform voltages having different levels are applied and a plurality of the slicer circuits according to the embodiment of FIG. 4 are connected in parallel.

As described above, in accordance with the convergence apparatus of the present invention, the horizontal parabolic waveform voltage $a$ given by integrating the horizontal deflecting current, is sliced by the voltage level corresponding to the vertical parabolic waveform voltage $b$ so as to divide it into at least two voltage signals and the divided voltage signals are respectively shaped and then, the shaped voltage signals are recombined to give the shaped convergence correction voltage signal $f$ and the current being proportional to the shaped voltage signal $f$ is fed to the convergence coil 7, whereby the CRT picture surface can be divided into the central part and the peripheral parts and suitable corrections can be given for the parts to attain the convergence correction having high accuracy on all of the picture surface. The practical advantage of the invention is remarkable.

What is claimed:

1. A convergence apparatus in a cathode-ray tube for displaying images by a raster scanning of electron beams which comprises means responsive to the amplitude of a vertical parabolic waveform voltage for dividing a horizontal parabolic waveform voltage into suitable voltage levels means for shaping the waveforms of the divided voltage signals;

means for composing the shaped voltage signals to give the shaped convergence correction voltage signal; and means for feeding the current corresponding to the shaped convergence correction voltage signal waveform to a convergence coil to correct the scanning positions of the electron beams.

2. A convergence apparatus according to claim 1 wherein the dividing means includes two series connected resistors, two series connected diodes in parallel with the two series connected resistors, means for applying the horizontal parabolic waveform voltage to the junction of the two resistors and means for applying the vertical parabolic waveform voltage to the junction of the two diodes to give each of two electric signals produced by slicing the horizontal parabolic waveform voltage into an upper part and a lower part at a respective junction of a resistor with a diode.

3. A convergence apparatus according to claim 1 which comprises a circuit for clamping by a diode after applying the electric signal to a capacitor in the means for shaping one of the waveforms of the divided electric signals.

4. A convergence apparatus according to claim 1 wherein the horizontal parabolic waveform voltage is given by integrating a horizontal deflecting current and the vertical parabolic waveform voltage is given by integrating a vertical deflecting current.

* * * * *